(12) United States Patent
Talagala et al.

(10) Patent No.: US 7,353,432 B1
(45) Date of Patent: Apr. 1, 2008

(54) MAINTAINING HIGH DATA INTEGRITY

(75) Inventors: Nisha D. Talagala, Livermore, CA (US); Brian Wong, Gordonsville, VA (US)

(73) Assignee: Sun Microsystems, Inc., Santa Clara, CA (US)

( * ) Notice: Subject to any disclaimer, the term of this patent is extended or adjusted under 35 U.S.C. 154(b) by 404 days.

(21) Appl. No.: 10/723,204

(22) Filed: Nov. 25, 2003

(51) Int. Cl.
*G06F 11/00* (2006.01)

(52) U.S. Cl. .................. 714/52; 714/4; 714/2; 714/43; 714/48

(58) Field of Classification Search .................. 714/4, 714/25, 43, 48, 52
See application file for complete search history.

(56) References Cited

U.S. PATENT DOCUMENTS

| | | | |
|---|---|---|---|
| 4,479,196 A | 10/1984 | Ferrer et al. |
| 5,197,148 A | 3/1993 | Blount et al. |
| 5,201,044 A | 4/1993 | Frey et al. |
| 5,206,939 A | 4/1993 | Yanai et al. |
| 5,692,184 A | 11/1997 | Ardoin et al. |
| 5,720,026 A | 2/1998 | Uemura et al. |
| 5,796,934 A | 8/1998 | Bhanot et al. |
| 5,819,275 A | 10/1998 | Badger et al. |
| 5,835,085 A | 11/1998 | Eick et al. |
| 5,889,934 A | 3/1999 | Peterson |
| 5,909,688 A | 6/1999 | Yoshioka et al. |
| 5,933,831 A | 8/1999 | Jorgensen |
| 5,995,308 A | 11/1999 | Assouad et al. |
| 6,009,542 A | 12/1999 | Koller et al. |
| 6,343,343 B1 | 1/2002 | Menon et al. |
| 6,347,359 B1 | 2/2002 | Smith et al. |
| 6,397,309 B2 | 5/2002 | Kedem et al. |
| 6,408,416 B1 | 6/2002 | Morley et al. |
| 6,418,519 B1 | 7/2002 | Cadden et al. |
| 6,438,591 B1 | 8/2002 | Fehskens et al. |
| 6,467,060 B1 | 10/2002 | Malakapalli et al. |
| 6,476,814 B1 | 11/2002 | Garvey |
| 6,484,185 B1 | 11/2002 | Jain et al. |
| 6,553,511 B1 | 4/2003 | DeKoning et al. |
| 6,584,544 B1 | 6/2003 | Morley et al. |
| 6,587,962 B1 | 7/2003 | Hepner et al. |
| 6,606,629 B1 | 8/2003 | DeKoning et al. |
| 6,629,273 B1 | 9/2003 | Patterson |

(Continued)

OTHER PUBLICATIONS

EMC, "The EMC CIARiiON Data Integrity Difference", pp. 1-11, May 2001.

*Primary Examiner*—Robert Beausoliel
*Assistant Examiner*—Charles Ehne
(74) *Attorney, Agent, or Firm*—Dorsey & Whitney LLP

(57) ABSTRACT

A protection domain for a set of errors is defined using an association between data and first integrity metadata to protect data traversing an input/output datapath. The datapath has a storage device as one endpoint and a first generation integrity point for a host as an opposite endpoint. A first sub-domain is defined within the protection domain using an association between the data and second integrity metadata to further protect a portion of the datapath having a second generation integrity point as one endpoint. In another aspect, a second sub-domain is defined within the protection domain using an association between the data and third integrity metadata further protect data traversing a portion of the datapath having a third generation integrity point as one endpoint. The first and second sub-domains are nested within the protection boundary and may be in a hierarchical relationship.

41 Claims, 6 Drawing Sheets

U.S. PATENT DOCUMENTS

| | | |
|---|---|---|
| 6,684,289 B1 | 1/2004 | Gonzalez et al. |
| 6,687,791 B2 | 2/2004 | Morrison |
| 6,728,922 B1 | 4/2004 | Sundaram et al. |
| 6,748,488 B2 | 6/2004 | Byrd et al. |
| 6,874,001 B2 | 3/2005 | Narang et al. |
| 6,880,060 B2 | 4/2005 | Talagala et al. |
| 6,931,576 B2 * | 8/2005 | Morrison et al. ............. 714/54 |
| 7,020,805 B2 | 3/2006 | Talagala et al. |
| 7,020,835 B2 * | 3/2006 | Loaiza et al. ............... 714/807 |
| 7,024,593 B1 * | 4/2006 | Budd et al. .................. 714/48 |
| 7,036,066 B2 | 4/2006 | Weibel et al. |
| 7,117,422 B2 | 10/2006 | Duncan et al. |
| 7,131,050 B2 | 10/2006 | Holt |
| 7,133,883 B2 | 11/2006 | Talagala et al. |
| 7,257,091 B2 | 8/2007 | Elko et al. |
| 2003/0145270 A1 | 7/2003 | Holt |
| 2004/0003316 A1 * | 1/2004 | Meng et al. .................. 714/13 |
| 2004/0123032 A1 | 6/2004 | Talagala et al. |
| 2004/0153746 A1 | 8/2004 | Talagala et al. |

* cited by examiner

MAINTAINING HIGH DATA INTEGRITY

FIELD OF THE INVENTION

This invention relates generally to data integrity, and more particularly to data integrity within an input/output data path.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2002, Sun Microsystems, Inc., All Rights Reserved.

BACKGROUND OF THE INVENTION

Data corruption is a major problem in large-scale data storage systems and in data transmission systems. In the short term, the corrupted data cause applications to return erroneous results and may result in the failure of the applications. Over the long term, the corrupted data may be replicated through multiple systems. In many instances, if the corruption is detected and the cause determined, the correct data may be recoverable.

Data corruption may occur due to anomalies in the input/output (I/O) datapath of data, including errors introduced by servers, networks, device interconnects, and storage systems. Three classes of data errors, bit corruption, misdirected I/Os, and phantom I/Os, are particularly difficult to detect. Bit corruption occurs when bits in a data block are erroneously changed or lost in the datapath. A misdirected I/O is caused by the storage system reading or writing the wrong block. A phantom write occurs when the storage system acknowledges writing a data block but the block is not actually written, leaving old data on the storage device. A phantom read occurs when the storage system sends erroneous data through the datapath in response to a read command, typically due to errors in the storage system controller or the storage device itself.

Integrity metadata, such as checksums and replicated data, may be used to detect the three classes of errors but typically, each component in the datapath associates its own form of integrity metadata with the data once the data is received. Thus, such metadata only covers a portion of the datapath so that data errors that occur prior to reaching a component may not be detected. Even if data corruption is detected, the source of the corruption can be difficult or impossible to identify because of the discontinuity of coverage of the metadata.

SUMMARY OF THE INVENTION

A protection domain for a set of errors is defined using an association between data and first integrity metadata to protect data traversing an input/output datapath. The datapath has a storage device as one endpoint and a first generation integrity point for a host as an opposite endpoint. A first sub-domain is defined within the protection domain using an association between the data and second integrity metadata to further protect a portion of the datapath having a second generation integrity point as one endpoint. In another aspect, a second sub-domain is defined within the protection domain using an association between the data and third integrity metadata further protect data traversing a portion of the datapath having a third generation integrity point as one endpoint. The first and second sub-domains are nested within the protection boundary and may be in a hierarchical relationship.

The present invention is described in conjunction with systems, clients, servers, methods, and machine-readable media of varying scope. In addition to the aspects of the present invention described in this summary, further aspects of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

A system level overview of the operation of an embodiment of the invention is described by reference to FIGS. 1A-B in which a protection domain for an I/O datapath detects and identifies classes of data errors that may occur as data traverses the datapath. In particular, the I/O datapath referred to herein represents any software, hardware, or other entities that manipulate data in block form (i.e., from the time the data enters block form on write operations to the point where the data leaves block form on read operations). The datapath extends from the host that reads or writes the data (converting it into block form) to the storage device where the data resides during storage. For example, the datapath may include software modules such as volume managers that stripe or replicate the data, the disk arrays that store the data blocks, the portion of the file system that manages data in blocks, the network that transfers the blocks, etc.

Figure 1A:
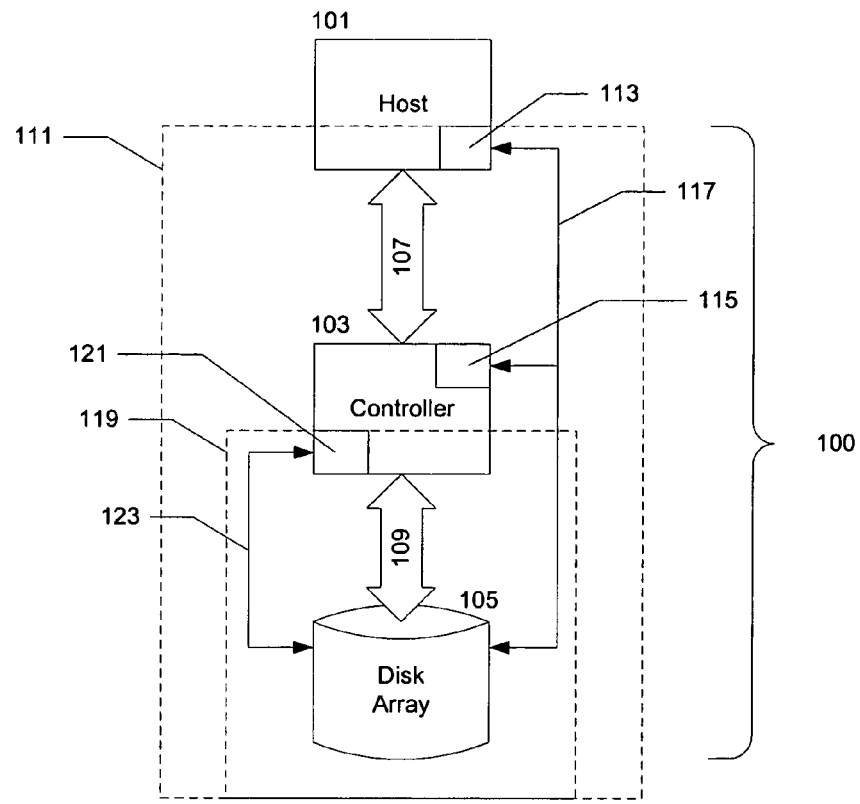
FIGS. 1A-B are diagrams illustrating a system-level overview of embodiments of the invention.

As illustrated in FIG. 1A, I/O datapath 100 has one endpoint at a generation integrity point 113 within a host 101 and another endpoint at a disk array 105, with controller 103 as an intermediary component in the datapath 100. When host 101 writes data, the generation integrity point 113 creates corresponding integrity metadata 117. A validation integrity point 115 within controller 103 uses the metadata 117 to validate the data after it traverses transfer point 107 between the host 101 and the controller 103. As illustrated, the metadata 117 is stored with the data on disk array 105. Alternatively, the metadata may be stored separately, perhaps on an entirely separate storage device or medium. When the host 101 requests the data, the metadata 117 is retrieved and validation integrity point 115 validates the data after it traverses transfer point 109 between the controller 103 and the disk array 105. For the reverse path, generation integrity point 113 acts as a validation point to ensure that the data is correctly received through transfer point 107. If an error is detected in the data by any of the integrity points, the integrity point may also identify the source of the error, or may pass the information to a detection module. Thus, a protection domain 111 is defined for the I/O data path 100 using the integrity metadata 117. It will be appreciated that although host 101 in FIG. 1A is described as both generating and consuming the data for simplicity in explanation, the boundaries of the protection domain encompass any host that stores and/or retrieves data from disk array 105.

As shown in FIG. 1A, a protection sub-domain 119 defined by integrity metadata 123 is nested within the protection domain 111. A generation integrity point 121 generates integrity metadata 123 before the data is stored and validates the data when it is retrieved. In one embodiment, the integrity metadata 117 can be used to detect the known classes of data errors occurring in the I/O datapath 100, while the integrity metadata 123 is specifically selected to detect data errors that typically occur in storage systems, such as the storage system formed by controller 103 and disk array 105. In an alternate embodiment, the integrity metadata 117, 123 both can be used to detect all known classes of data errors. In yet another embodiment, the integrity metadata 117, 123 can be used to detect different sub-sets of the known classes of data errors and together cover all the known classes. For example, phantom writes have been known to occur in disk drives and, if the rest of the storage subsystem does not need protection from these errors, generation identifiers are suitable for use as integrity metadata 123 for disk array 105.

While only one sub-domain has been illustrated in FIG. 1A, it will be appreciated that sub-domains can be nested within sub-domains, forming a hierarchy of sub-domains.

Figure 1B:
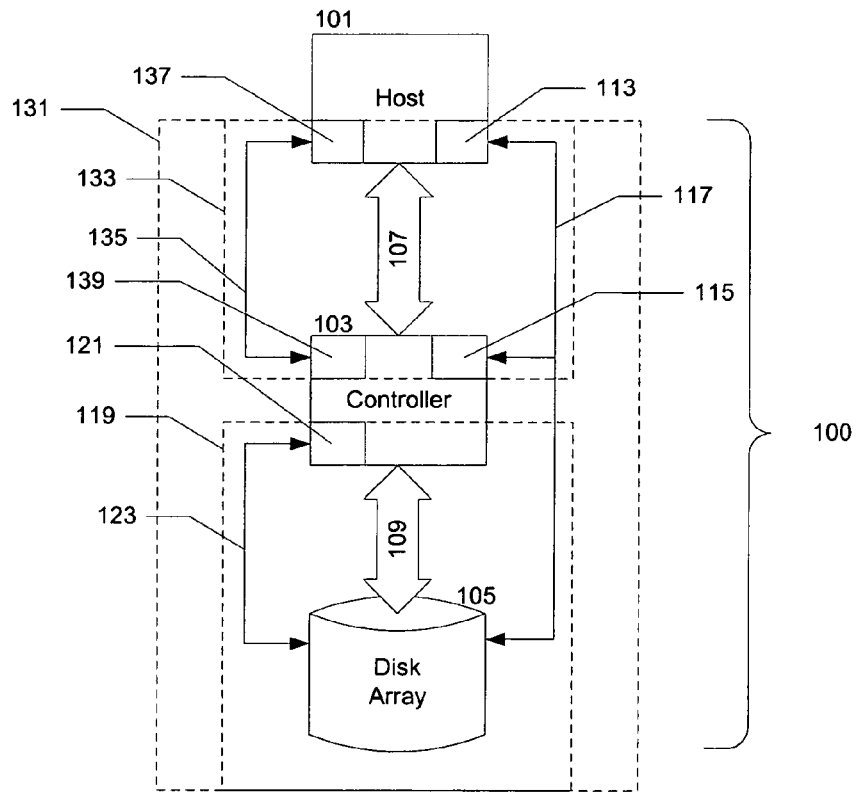

FIG. 1B illustrates a protection domain 131 that protects the data in the I/O datapath 100 using two nested sub-domains that are non-hierarchical, i.e., their sub-domains do not overlap. Protection domain 131 itself is defined using the integrity metadata 117 described above. Sub-domain 119 is defined as described above in conjunction with FIG. 1A. Sub-domain 133 is defined by integrity metadata 135 generated by generation integrity points 137, 139. As illustrated in FIG. 1B, the integrity metadata 135 is specifically selected to detect the type of errors that occur in the particular transfer medium underlying transfer point 107 and therefore it is not necessary to store metadata 135 on the disk array 105. For example, bit errors occur in transfer busses so checksums or an equivalent are suitable for use as integrity metadata 135. Thus, the integrity points 137, 139 each generate the integrity metadata 135 when the data traverses the transfer point 107 in one direction and validate the data when it traverses the transfer point 107 in the opposite direction.

The integrity metadata may be used to detect data corruptions through any commonly used mechanisms. In one embodiment, data corruption is detected as disclosed in pending U.S. patent application Ser. No. 10/222,074 titled "Efficient Mechanisms for Detecting Phantom Write Errors" filed on Aug. 15, 2002 and assigned to the assignee of the present invention. Once detected, the cause or source of the corruption may be determined using various procedures. In one embodiment, graph analysis is used to identify the source of the error as described in U.S. patent application Ser. No. 10/329,077 titled "General Techniques for Diagnosing Data Corruptions" filed on Dec. 23, 2002 and assigned to the assignee of the present invention. Furthermore, data replication points may be located above, below, or within the boundaries of the protection sub-domains. Identification of the source of the error thus also identifies which replica of the data or metadata, if any, can be used to recover from the error and resume the transfer of the data after the replication point. For example, if the data (and perhaps the metadata) is mirrored at the replication point, the mirrored copies of the data and metadata can be used in diagnosing the error. If the diagnosis reveals that the original data is corrupted, the transfer can continue with the mirrored data. Co-locating a replication point with a integrity point, i.e., within the boundary of a protection sub-domain, provides the most information for identifying the source of the error when graph analysis is used because such co-location allows both relationships between data replicas and relationships between data and integrity metadata to be used in diagnosis, producing a denser graph. If a potential source of the error cannot be identified, or if the identified replica is also invalid, the transfer from the integrity point previous to the integrity point at which the error was detected can be re-tried. Alternatively, the latter case is used as the default and no attempt is made to identify the source of the error.

The invention has been illustrated in conjunction with an I/O datapath having only two transfer points for ease of explanation but the invention is not so limited and is applicable to any length datapath between a host and a storage device. Furthermore, although FIGS. 1A and 1B illustrate the integrity points 115, 121 integrity points 113, 137, and integrity points 115, 139 as separate blocks, it will be appreciated that the generation and/or validation procedure for the corresponding types of integrity metadata can be combined into a single module.

One embodiment of a protection domain method 200 to be performed by integrity modules within the protection domains is described with reference to a flowchart shown in FIG. 2A. FIG. 2B is a flowchart of a sub-domain method 230 to be performed by integrity modules in a nested sub-domain.

Figure 2A:
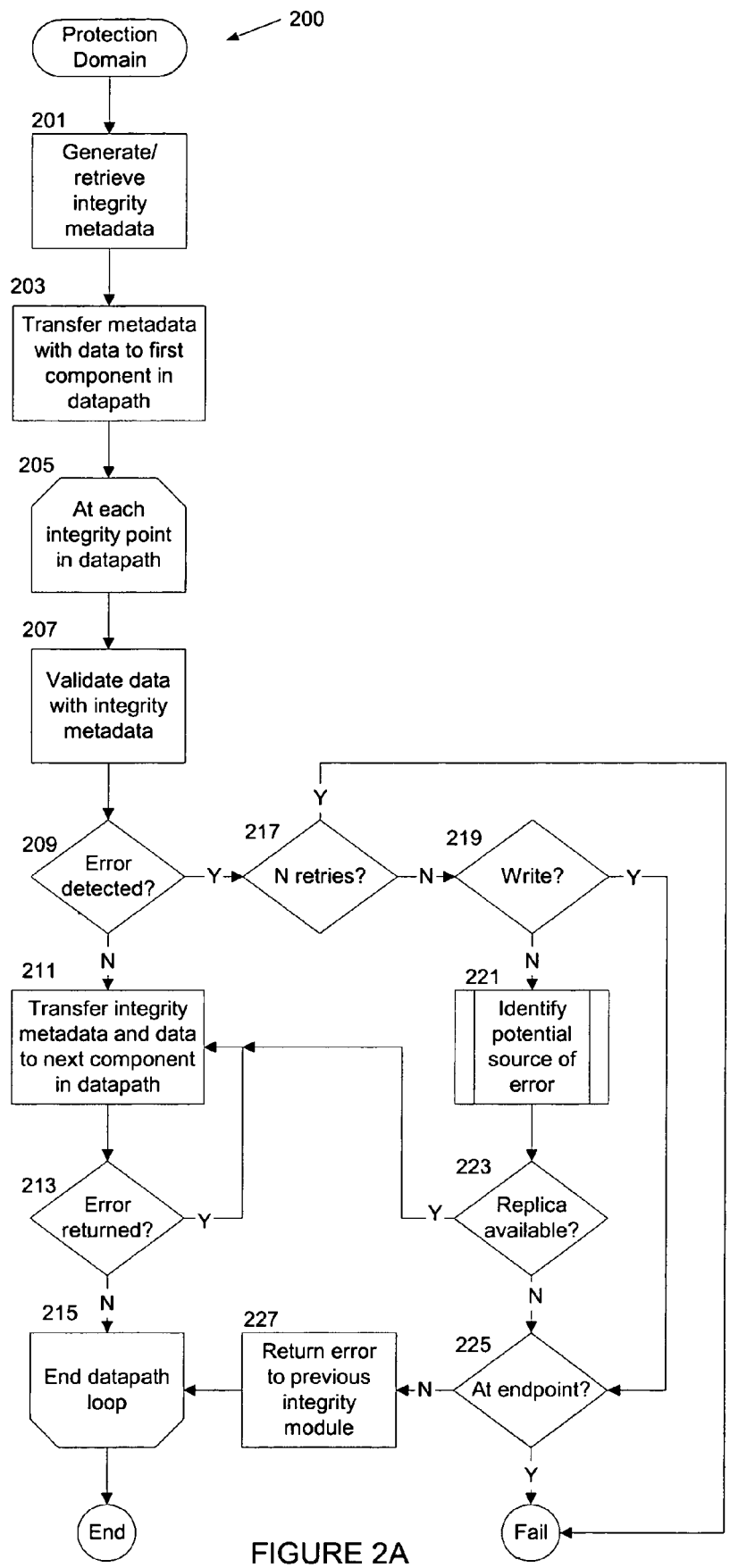
FIG. 2A is a flowchart of a method to be performed by a protection domain according to an embodiment of the invention.
Figure 2B:
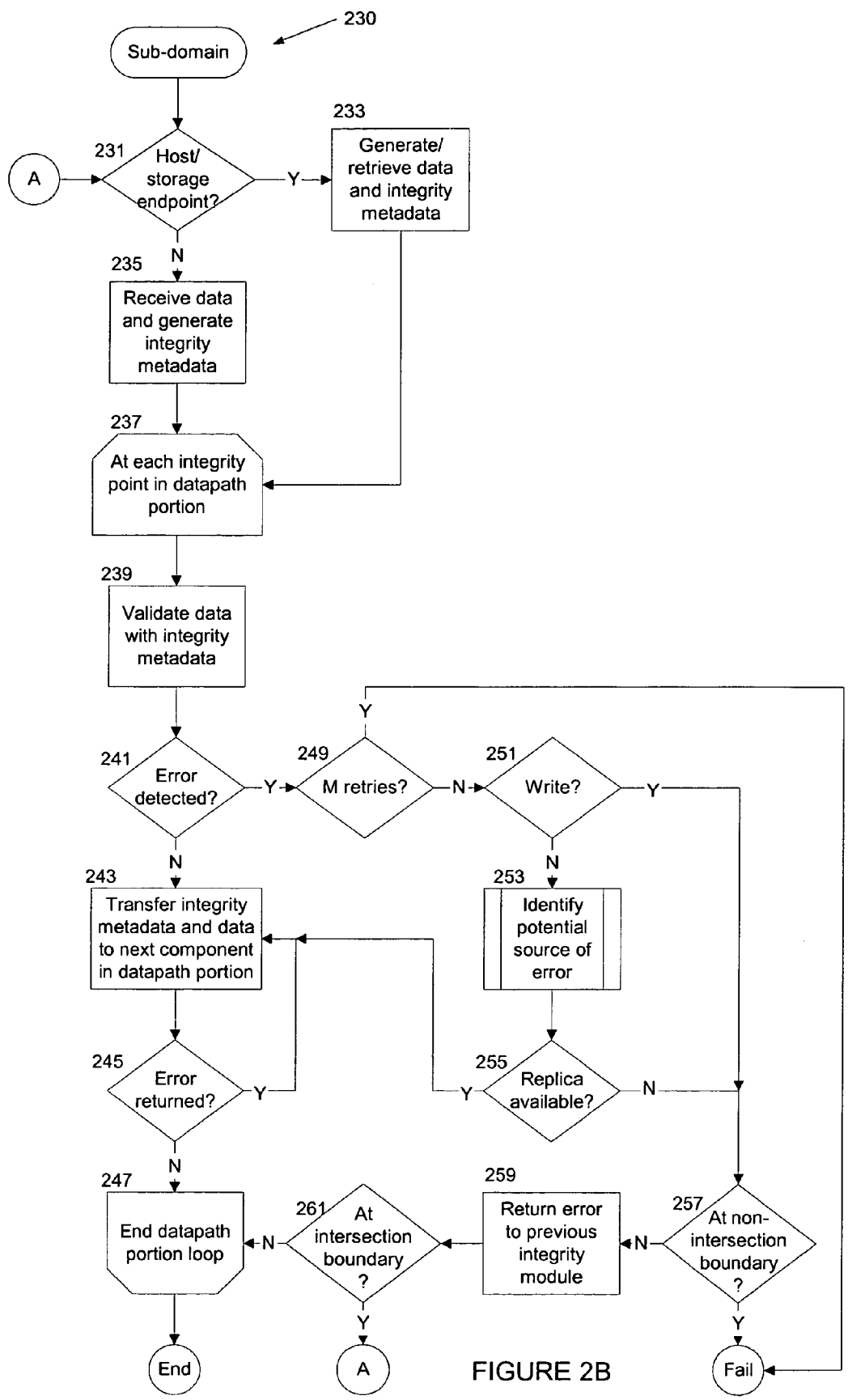
FIG. 2B is a flowchart of a method to be performed by a sub-domain with the protection domain of FIG. 2B.

Referring first to FIG. 2A, for a write transaction, the integrity module within the host generates integrity metadata for the data being written (block 201). Alternatively at block 201, for a read transaction, the integrity module within the storage system retrieves the integrity metadata along with the data being read. The metadata and data is transferred to the first component in the datapath (block 203). At each integrity point in the datapath, a series of operations is performed by the corresponding integrity module, illustrated as a processing loop in FIG. 2A beginning at block 205 and ending at block 215. Once the data has traversed the datapath from one endpoint to the other without error, the method 200 ends.

When data is received through a transfer point by a component containing an integrity point, the integrity module in the receiving component validates the data with the metadata (block 207). If there is no error (block 209), the data and the metadata are transferred to the next component in the path (block 211).

If an error is detected at block 209, the integrity module determines if it has requested a maximum number of re-tries (N) from the previous integrity module to correct the error (block 217). If not and the transaction is a read (block 219), the potential source of the error is identified as described above (block 221). The identification process represented by block 221 may be part of the integrity module that detected the error or may be a separate module that is invoked by the integrity module. Once the potential source is identified, the integrity module (or alternate module) determines if the data and/or metadata was replicated prior to the source in the datapath and if the replica is good (block 223). If so, the transfer of the data is resumed with the replicated data/metadata (block 211). In one embodiment, the integrity module previous to or co-located with the replication point is responsible for resuming the transfer. If no good replica is available, the integrity module determines if it is at an endpoint of the datapath (block 225). If it is at an endpoint, the integrity module will fail the transaction and return an error to the host, which may re-submit the transaction to the datapath. If the integrity module is not at an endpoint, an error is returned to the previous integrity module (block 227), which causes the previous transfer to be re-tried as described above in conjunction with block 213.

If at block 219, the transaction is determined to be a write, processing continues at block 225 and proceeds as described above. Returning to block 217, it will be appreciated that each integrity module maintains a count of the number of times it requests a re-try for an particular error to determine when it should consider the transaction failed. In an alternate embodiment not shown, no attempt is made to discover the source of the error and all errors are handled by re-trying the transfer by the previous integrity module. In still another embodiment, a global fault manager handles the error re-try processing and may reduce the number of re-try loops based on other information related to the transaction.

The processing by an integrity module within a sub-domain is similar to that of an integrity module in the protection domain, except that sub-domain integrity modules may be configured to validate data using both the sub-domain integrity data and the domain integrity data. For example, an integrity module at the boundary of a sub-domain may be configured to validate data entering the sub-domain from the protection domain using domain metadata passed to it by the domain integrity module. Such an integrity module is termed an "intersection boundary" module and is also capable of returning an error to the domain integrity point that transferred the data into the sub-domain. An integrity module at a sub-domain boundary that does not validate data entering the sub-domain is termed a "non-intersection boundary" module and will be unaware of data errors caused by the transfer of the data into the sub-domain.

Turning now to FIG. 2B, if the boundary integrity module in the sub-domain is at an endpoint of the datapath (block 231), the integrity module either retrieves or generates sub-domain integrity metadata for the data (block 233). Otherwise, the boundary integrity module receives the data from a prior component in the datapath and generates the corresponding sub-domain integrity metadata (block 235). At each integrity point in the portion of the datapath protected by the sub-domain, a series of operations are performed by the corresponding integrity module, illustrated as a processing loop in FIG. 2B beginning at block 237 and ending at block 247. Once the data has traversed the portion of datapath protected by the sub-domain without error, the method 230 ends.

The integrity module at the receiving component validates the data with the sub-domain integrity metadata and optionally the domain integrity metadata (block 239). If an error is detected (block 241), the integrity module determines if it has requested a maximum number of re-tries (M) to correct the error from the previous integrity module (block 249). If it has, the transaction will be failed and an error will be returned to the host as described above. If it has not and the transaction is a read (block 251), the current integrity module may identify the potential source of the error at block 253 or may invoke a separate module to do so. If the data and/or metadata was replicated before the source of the error and if such a replica is good (block 255), the transfer is resumed with the replica (block 243). The handling of an error when either a replica is unavailable at block 255 or if the transaction is a write at block 251, depends on the type of the integrity module. If the integrity module is a non-intersection boundary module (block 257), the transaction will be failed and an error will be returned to the host since a non-intersection boundary module is unaware of the previous domain integrity module and therefore cannot request that it re-try the transfer. All other types of sub-domain integrity modules cause an error to be returned to the previous integrity module at block 259. The previous transfer is re-tried at blocks 245, 243 or blocks 213, 211 of FIG. 2A, depending on whether the previous integrity module is a sub-domain or domain integrity module. If the current integrity module is an intersection boundary module (block 261), the re-try will be performed by a domain integrity module and thus the sub-domain method 230 will return to block 231 to await the transfer.

Figure 3:
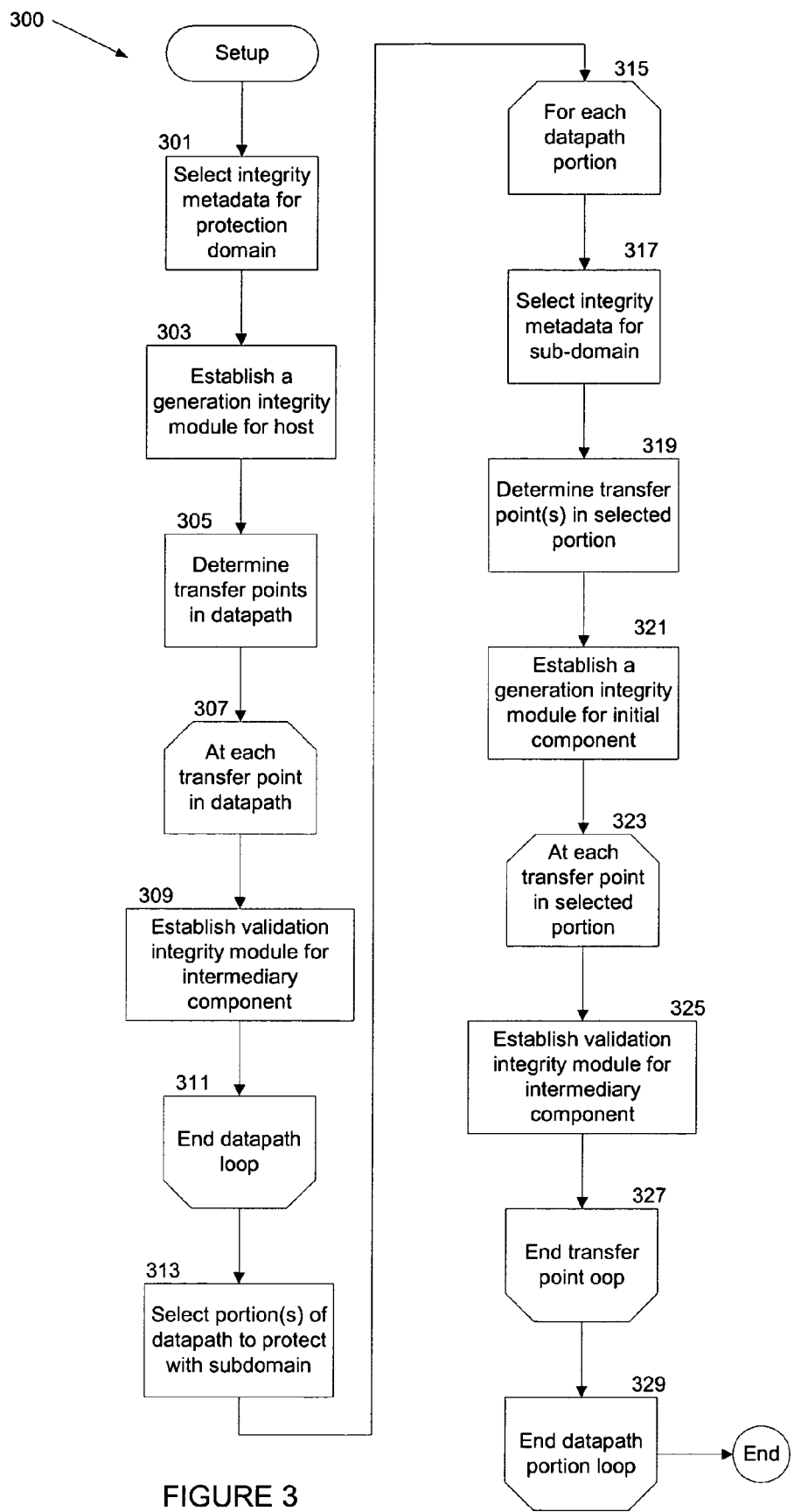
FIG. 3 is a flowchart of a method to be performed to create a protection domain according to one embodiment of the invention.

In one embodiment, the setup of protection domain and sub-domains for a datapath when the host reads or writes data may be performed as illustrated in FIG. 3. It will be appreciated that the protection domain and sub-domains may be setup by the entity that connects components into an I/O datapath. However, the setup method 300 of FIG. 3 is also contemplated as automatic to adapt to changes in the I/O datapath without human intervention.

Integrity metadata that will detect a desired set of data errors is selected (block 301) and a generation integrity point that will generate the selected data is established for the host endpoint of the datapath (block 303). It will be appreciated that the generation integrity point may be logically incorporated into the host or may reside as a separate module that is invoked by the host. The transfer points in the datapath are determined (block 305) and for each transfer point in the datapath, a validation integrity point is established for each intermediary component at a transfer point (blocks 307, 309, 311). One or more portions of the datapath may be selected as requiring the additional protection of a sub-domain (block 313). For each selected datapath portion, a series of operations are performed, illustrated in FIG. 3 as a processing loop beginning at block 315 and ending at block 329. Appropriate integrity metadata is selected for the selected portion (block 317) and transfer points in the datapath are determined (block 319). A generation module for the initial component in the datapath portion is established (block 321). It will be appreciated that the initial component will depend on the direction the data is traversing the portion of the datapath. For each transfer point in the selected portion, a validation integrity module is established (block 323, 325, 327).

In practice, the methods illustrated in FIGS. 2A, 2B and 3 may constitute one or more programs made up of machine-executable instructions. Describing the method with reference to the flowcharts in FIGS. 2A, 2B and 3 enables one skilled in the art to develop such programs, including such instructions to carry out the operations (acts) represented by the logic blocks on suitably configured machines (the processor of the machine executing the instructions from machine-readable media). The machine-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the method illustrated in FIGS. 2A, 2B and 3 without departing from the scope of the invention and that no particular order is implied by the arrangement of blocks shown and described herein.

Figure 4A:
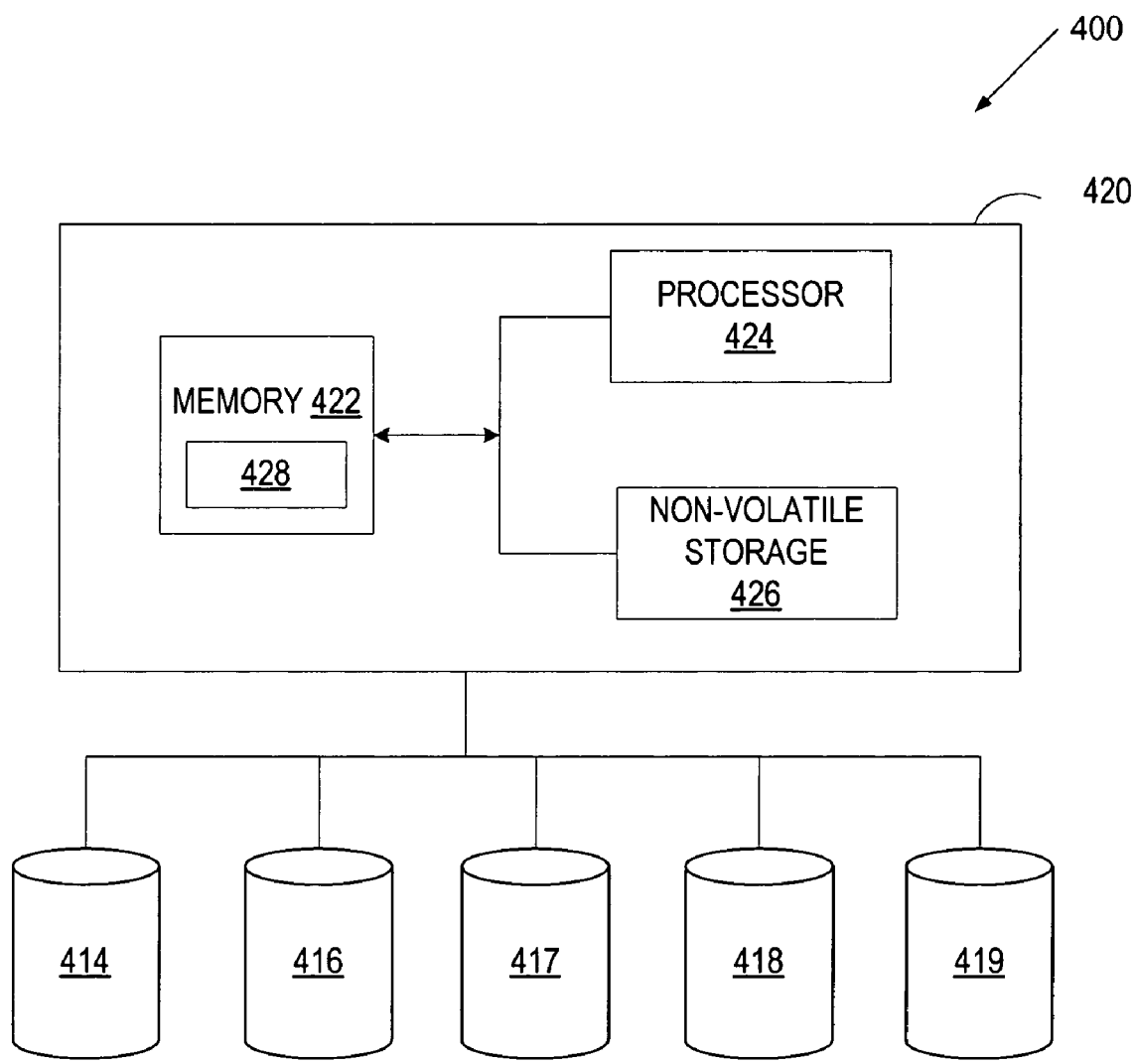
FIGS. 4A-B are diagrams of exemplary processing environments in which embodiments of the invention may incorporated.

FIG. 4A illustrates an exemplary embodiment of a data storage system which may be protected as part of a protection domain as described above. A data storage system 400 contains a disk array composed of one or more sets of storage devices (redundancy groups) such as disks 415-419 that may be magnetic or optical storage media or any other fixed-block storage media, such as memory cells. Data in disks 415-419 is stored in blocks (e.g., fixed length data blocks, commonly 512-, 1024- or 4096-bytes in length).

Data storage system 400 also contains an array controller 420 that controls the operation of the disk array. Array controller 420 provides the capability for data storage system 400 to perform tasks and execute software programs stored within the data storage system. Array controller 420 includes one or more processors 424, memory 422 and non-volatile storage 426 (e.g., non-volatile access memory (NVRAM), flash memory, etc.). Memory 422 may be random access memory (RAM) or some other machine-readable medium, for storing program code (e.g., software for performing any method of the present invention) that may be executed by processor 420. The machine-readable medium may include a mechanism that provides (i.e., stores and/or transmits) information in a form readable by a machine such as a computer or digital processing device. For example, a machine-readable medium may include a read only memory (ROM), random access memory (RAM), magnetic disk storage media, optical storage media, flash memory devices, etc. The code or instructions may be represented by carrier-wave signals, infrared signals, digital signals, and by other like signals. Non-volatile storage 426 is a durable data storage area in which data remains valid during intentional and unintentional shutdowns of data storage system 400.

In one embodiment, controller 420 includes a integrity module 428 for validating data within the data storage system 400 as described above. Module 428 may be implemented in hardware, software, or a combination of both. In one embodiment, software module 428 is stored in memory 422.

Figure 4B:
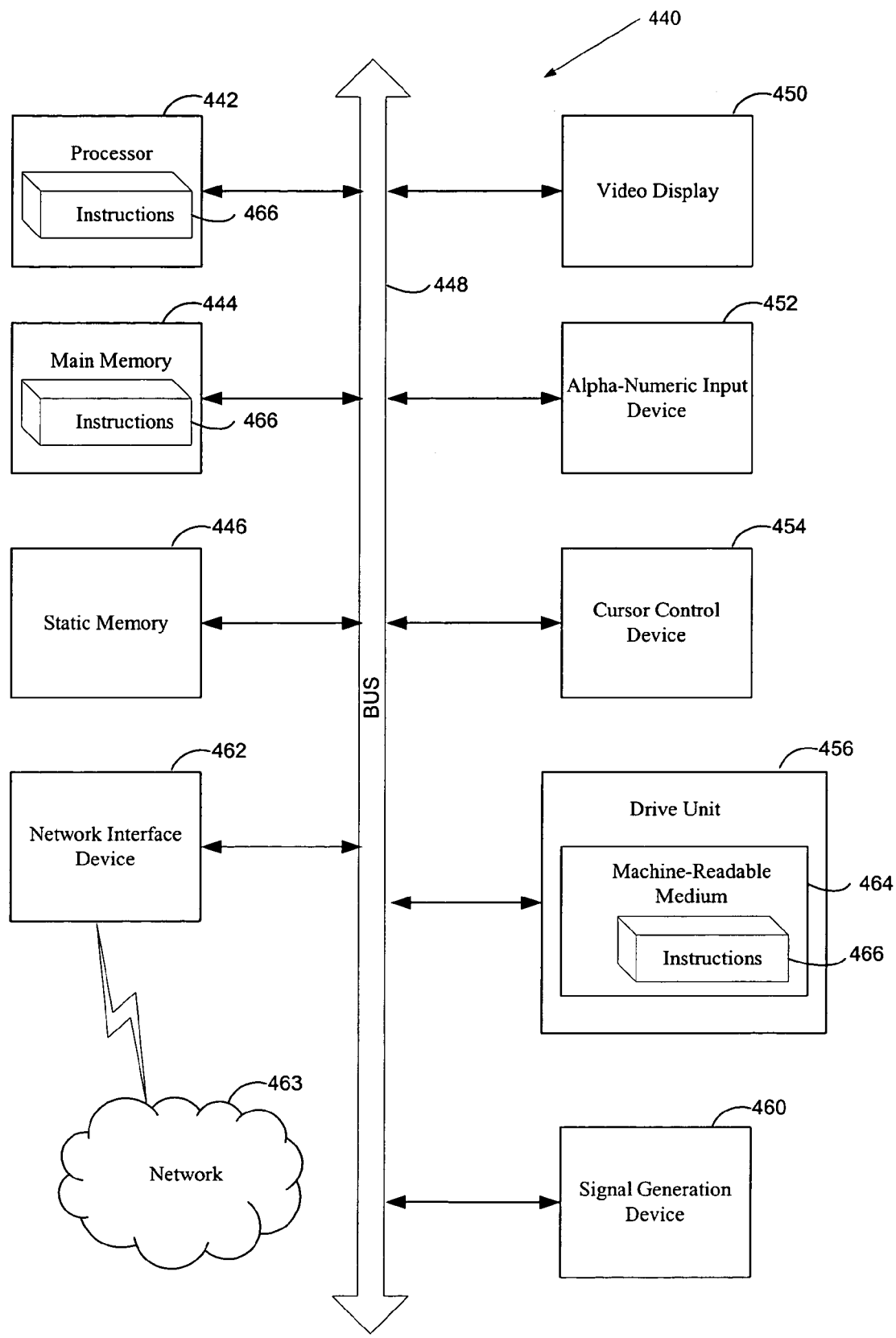

The integrity points may be incorporated into a machine such as computer system 440 illustrated in FIG. 4B. In alternative embodiments, the machine may comprise a network router, a network switch, a network bridge, or any machine capable of executing a sequence of instructions that specify actions to be taken by that machine.

The computer system 440 includes a processor 442, a main memory 444, and a static memory 446, such as non-volatile storage, which communicate with each other via a bus 448. The computer system 440 may further include a video display unit 450, an alpha-numeric input device 452, a cursor control device 454, a disk drive unit 456, a signal generation device 460 and a network interface device 462.

The disk drive unit 456 includes a machine-readable medium 464 on which is stored a set of instructions or modules 466 embodying any one, or all, of the methodologies described above. The instructions 466 are also shown to reside, completely or at least partially, within the main memory 444 and/or within the processor 442. The disk drive unit 456 is typically one or more disk drives that do not participate in the redundancy relationships previously described for FIG. 4A.

The computer system 440 interfaces to external systems through the modem or network interface 462. It will be appreciated that the modem or network interface 462 can be considered to be part of the computer system 440. This interface 462 can be an analog modem, ISDN modem, cable modem, token ring interface, satellite transmission interface (e.g. "Direct PC"), or other interfaces for coupling a computer system to other computer systems. The computer system 440 and the external systems can be connected in a local area network (LAN) configuration, in a wide-area network (WAN) configuration, a metropolitan area network (MAN) configuration, or in a storage area network (SAN), among others (generically represented as network 463). The network 463 can be either public or private.

It will be appreciated that the computer system 440 is one example of many possible computer systems which have different architectures and are controlled by operating systems software, such as Solaris™ from Sun Microsystems, Inc. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. Thus, the description of FIG. 4B is intended to provide an overview of computer hardware and other operating components suitable for performing the methods of the invention described above, but is not intended to limit the applicable environments.

A protection domain with a nested sub-domain to protect data traversing an I/O datapath has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application with respect to data and storage systems is meant to include all environments in which data is generated, stored and retrieved, regardless of file format. Therefore, it is manifestly intended that this invention be limited only by the following claims and equivalents thereof.

What is claimed is:

1. A computerized method comprising:
   defining a protection domain for a set of errors using an association between data and a first integrity metadata, the protection domain to protect data traversing an input/output (I/O) datapath having a storage device and a first generation integrity point for a host as opposite endpoints;
   defining a first sub-domain nested within the protection domain using an association between the data and a second integrity metadata, the first sub-domain to further protect data traversing a portion of the datapath having a second generation integrity point as an endpoint;
   defining a second sub-domain nested within the protection domain using an association between the data and a third integrity metadata, the second sub-domain to further protect data traversing a portion of the datapath having a third generation integrity point as an endpoint; and
   wherein the first and second sub-domains are nested in the protection domain as a hierarchy.

2. The computerized method of claim 1, wherein the third integrity metadata is operable to detect a subset of the set of data errors.

3. The computerized method of claim 1, wherein the first integrity metadata is operable to detect a first subset of the set of data errors.

4. The computerized method of claim 3, wherein the second integrity metadata is operable to detect a second subset of the set of data errors.

5. The computerized method of claim 4, wherein the first and second subsets together are operable to detect the set of data errors.

6. The computerized method of claim 1, wherein the portion of the datapath protected by the first sub-domain has one of the storage device and host as an opposite endpoint.

7. The computerized method of claim 1, wherein the set of data errors comprises bit corruption, misdirected I/O, and phantom I/O.

8. The computerized method of claim 1 further comprising:
   detecting a data error within the protection domain using at least one of the first and second integrity metadata; and
   identifying a portion of the I/O data path as a potential source of the data error.

9. The computerized method of claim 8, wherein detecting a data error comprises:
   validating the data at one of the first and second integrity points.

10. The computerized method of claim 8 further comprising:
    retrying a data transfer at the potential source of the data error.

11. The computerized method of claim 10 wherein retrying comprises:
    resuming the data transfer using a replica.

12. The computerized method of claim 8 further comprising:
    retrying a data transfer at an integrity point prior to the potential source of the data error.

13. The computerized method of claim 1, wherein a replication point is co-located with at least one of the first and second generation integrity points.

14. The computerized method of claim 1 further comprising:
    establishing the first generation integrity point for the host; and
    establishing the second generation integrity point for an intermediary component in the datapath.

15. An article of manufacture comprising:
    a computer readable storage medium having computer readable instructions embodied therein to cause a processor to execute a method comprising:
    defining a protection domain for a set of errors using an association between data and a first integrity metadata, the protection domain to protect data traversing an input/output (I/O) datapath having a storage device and a first generation integrity point for a host as opposite endpoints;
    defining a first sub-domain nested within the protection domain using an association between the data and a second integrity metadata, the first sub-domain to further protect data traversing a portion of the datapath having a second generation integrity point as an endpoint;
    defining a second sub-domain nested within the protection domain using an association between the data and a third integrity metadata, the second sub-domain to further protect data traversing a position of the datapath having a third generation integrity point as an endpoint; and
    wherein the first and second sub-domains are nested in the protection domain as a hierarchy.

16. The article of manufacture of claim 15, wherein the third integrity metadata is operable to detect a subset of the set of data errors.

17. The article of manufacture of claim 15, wherein the first integrity metadata is operable to detect a first subset of the set of data errors.

18. The article of manufacture of claim 17, wherein the second integrity metadata is operable to detect a second subset of the set of data errors.

19. The article of manufacture of claim 18, wherein the first and second subsets together are operable to detect the set of data errors.

20. The article of manufacture of claim 15, wherein the portion of the datapath protected by the first sub-domain has one of the storage device and host as an opposite endpoint.

21. The article of manufacture of claim 15, wherein the set of data errors comprises bit corruption, misdirected I/O, and phantom I/O.

22. The article of manufacture of claim 15, wherein the method further comprises:
    detecting a data error within the protection domain using at least one of the first and second integrity metadata; and
    identifying a portion of the I/O data path as a potential source of the data error.

23. The article of manufacture of claim 22, wherein detecting a data error comprises:
    validating the data at one of the first and second integrity points.

24. The article of manufacture of claim 22, wherein the method further comprises:
    retrying a data transfer at the potential source of the data error.

25. The article of manufacture of claim 24 wherein retrying comprises:
resuming the data transfer using a replica.

26. The article of manufacture of claim 22, wherein the method further comprises:
retrying a data transfer at an integrity point prior to the potential source of the data error.

27. The article of manufacture of claim 15, wherein a replication point is co-located with at least one of the first and second generation integrity points.

28. The article of manufacture of claim 15, wherein the method further comprises:
establishing the first generation integrity point for the host; and
establishing the second generation integrity point for an intermediary component in the datapath.

29. An apparatus comprising:
means for defining a protection domain for a set of errors using an association between data and a first integrity metadata, the protection domain to protect data traversing an input/output (I/O) datapath having a storage device and a first generation integrity point for a host as opposite endpoints;
means for defining a first sub-domain nested within the protection domain using an association between the data and a second integrity metadata, the first sub-domain to further protect data traversing a portion of the datapath having a second generation integrity point as an endpoint;
means for defining a second sub-domain nested within the protection domain using an association between the data and a third integrity metadata, the second sub-domain to further protect data traversing a portion of the datapath having a third generation integrity point as an endpoint;
wherein the first and second sub-domains are nested in the protection domain as a hierarchy; and
wherein the third integrity metadata is operable to detect a subset of the set of data errors.

30. The apparatus of claim 29, wherein the first integrity metadata is operable to detect a first subset of the set of data errors.

31. The apparatus of claim 30, wherein the second integrity metadata is operable to detect a second subset of the set of data errors.

32. The apparatus of claim 31, wherein the first and second subsets together are operable to detect the set of data errors.

33. The apparatus of claim 29, wherein the portion of the datapath protected by the first sub-domain has one of the storage device and host as an opposite endpoint.

34. The apparatus of claim 29, wherein the set of data errors comprises bit corruption, misdirected I/O, and phantom I/O.

35. The apparatus of claim 29 further comprising:
means for detecting a data error within the protection domain using at least one of the first and second integrity metadata; and
means for identifying a portion of the I/O data path as a potential source of the data error.

36. The apparatus of claim 35, wherein the means for detecting a data error comprises:
means for validating the data at one of the first and second integrity points.

37. The apparatus of claim 35 further comprising:
means for retrying a data transfer at the potential source of the data error.

38. The apparatus of claim 37 wherein the means for retrying comprises:
means for resuming the data transfer using a replica.

39. The apparatus of claim 35 further comprising:
means for retrying a data transfer at an integrity point prior to the potential source of the data error.

40. The apparatus of claim 29, wherein a replication point is co-located with at least one of the first and second generation integrity points.

41. The apparatus of claim 29 further comprising:
means for establishing the first generation integrity point for the host; and
means for establishing the second generation integrity point for an intermediary component in the datapath.

* * * * *